United States Patent
Sperling

[11] Patent Number: 5,473,132
[45] Date of Patent: Dec. 5, 1995

[54] ARCWELDING OR CUTTING TORCH

[75] Inventor: Hermann Sperling, Gau Bischofsheim, Germany

[73] Assignee: Alexander Binzel GmbH & Co. KG, Germany

[21] Appl. No.: 226,637

[22] Filed: Apr. 12, 1994

[30] Foreign Application Priority Data

Apr. 13, 1993 [DE] Germany ............ 43 11 824.0
Apr. 29, 1993 [DE] Germany ............ 43 14 097.1

[51] Int. Cl.⁶ .................................................. B23K 9/28
[52] U.S. Cl. .................................................. 219/75
[58] Field of Search ..................... 219/75, 137.62

[56] References Cited

U.S. PATENT DOCUMENTS

| | | | |
|---|---|---|---|
| 2,659,797 | 11/1953 | Anderson et al. | 219/75 |
| 2,798,145 | 7/1957 | Vogel | 219/75 |
| 2,799,769 | 7/1957 | Vogel | 219/75 |
| 2,863,984 | 12/1958 | Schaefer et al. | 219/75 |
| 2,903,560 | 9/1959 | Barfuss et al. | 219/75 |
| 2,922,868 | 1/1960 | Hackman et al. | 219/75 |
| 2,943,183 | 6/1960 | Simms et al. | 219/75 |
| 3,250,889 | 5/1966 | Himmelman | 219/75 |
| 4,924,065 | 5/1990 | Vito | 219/138 |

FOREIGN PATENT DOCUMENTS

| | | |
|---|---|---|
| 0151100 | 8/1985 | European Pat. Off. . |
| 900855 | 1/1954 | Germany . |
| 3435050 | 4/1986 | Germany . |

*Primary Examiner*—Clifford C. Shaw
*Attorney, Agent, or Firm*—Price, Heneveld, Cooper, DeWitt & Litton

[57] ABSTRACT

An arc welding or cutting torch includes a torch body, a jacket encased within the torch body, an electrode holder encased within the jacket and a heat dissipater interposed between the electrode holder and the jacket. The heat dissipater is made of a material with a greater thermal conductivity than the material forming the electrode holder.

20 Claims, 4 Drawing Sheets

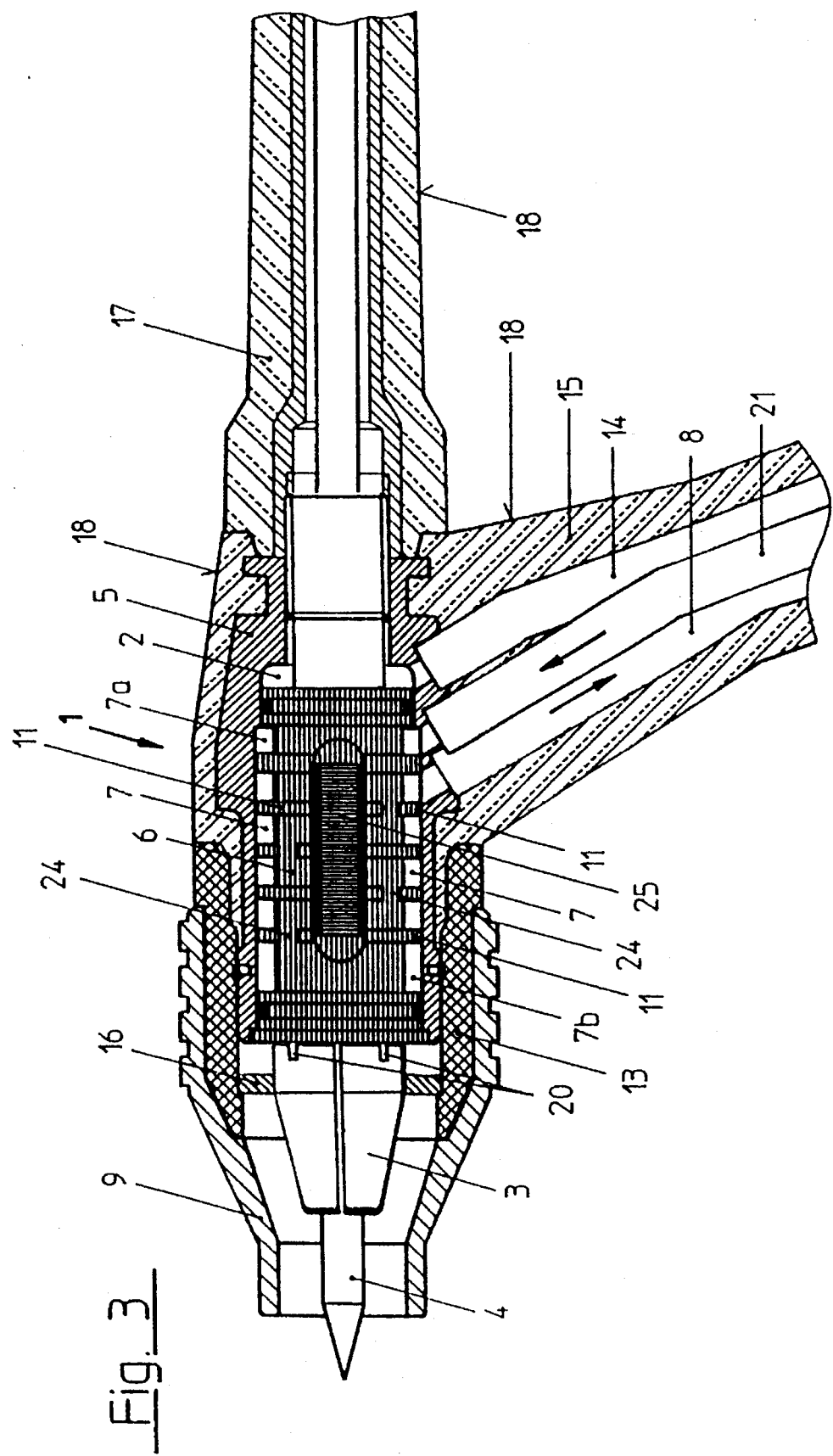

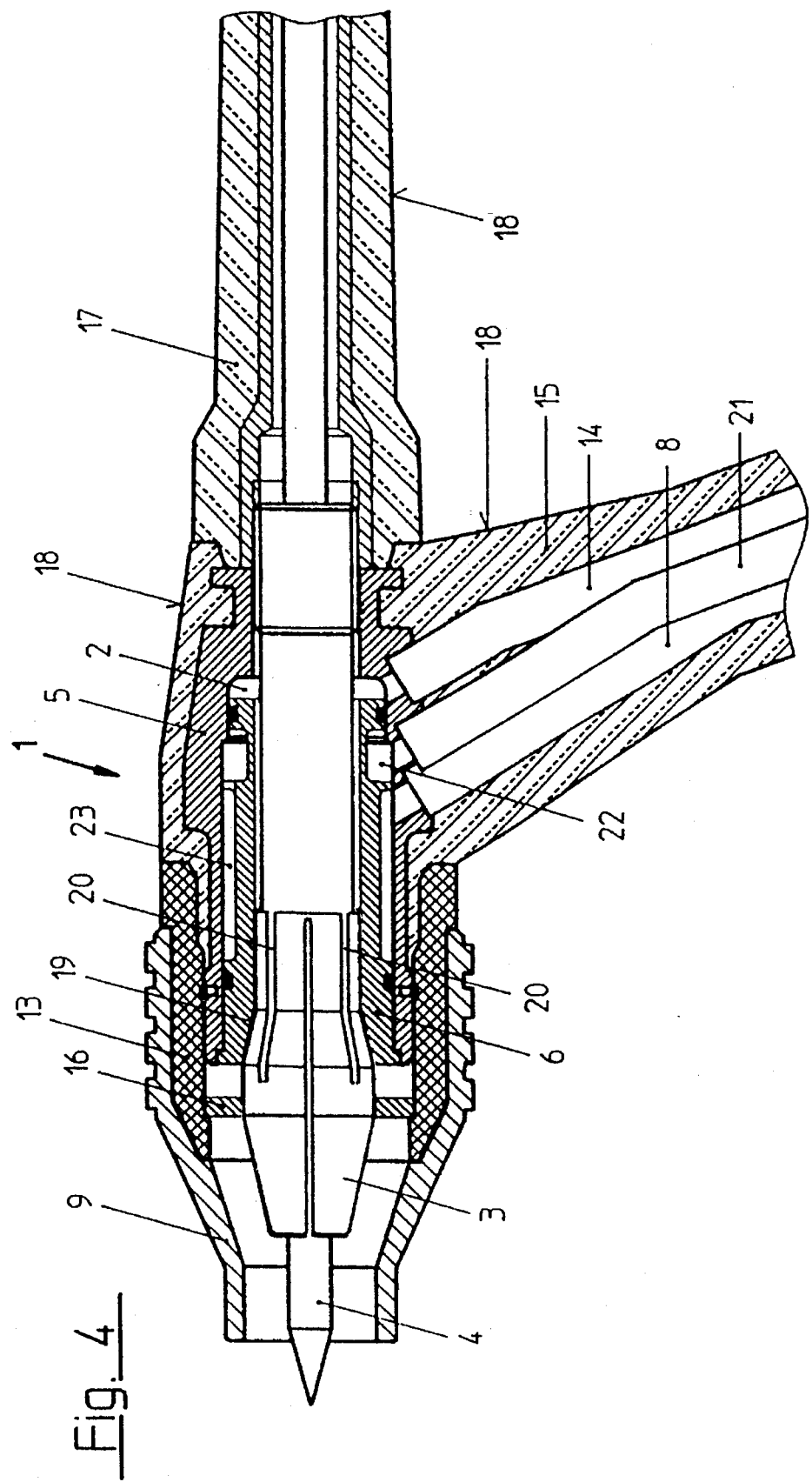

ARCWELDING OR CUTTING TORCH

BACKGROUND OF THE INVENTION

The invention applies to an arcwelding or cutting torch with a torch body with a built in electrode holder for an electrode.

The essential components of a liquid or gas cooled arcwelding or cutting torch are, aside from the electrode, the electrode holder and the torch body containing the housing for the electrode holder. In most familiar welding torches, the torch bodies with the housing consist mainly of non-ferrous metals, predominantly brass or copper. The electrode holder, or the adapter sleeve in the case of WIG or plasma welders and the nozzle in MIG/MAG welding torches, is frequently made of copper, but sometimes also of brass. The disadvantage with most familiar welding torches is, that the high voltages, and consequently their thermal loads, require high volume flow of coolant for the tools, which impacts the necessary tool sizes. Moreover, the thermal problems, especially for liquid cooled arcwelders are partially due to the fact, that the cooling medium is not injected precisely enough in the connecting area of the torch neck to the torch body. The resulting heat flow can lead to the overheating of the torch tip and the handle, so that the insulating plastic covering can melt in the area of the torch tip. The sometimes extremely high thermal loads also lead to a rapid turnover of the active components and subsequently to a short tool life.

SUMMARY OF THE INVENTION

Based upon all this, the objective of this invention is to further develop an arcwelding or cutting torch of the above described type in such a way, that it will reduce the thermal loads on the arcwelder and avoid overheating the torch tip and the handle, while keeping the design and construction simple.

To solve this problem, the invention proposes to insert a heat dissipater between the jacket of the torch body and the electrode holder. The material of this heat dissipater possesses better heat conductivity than that of the electrode holder or the jacket of the torch body.

The invention achieves a fast and efficient elimination of stray power caused by the contact of the electrode holder and the electrode. This is possible because the materials of the heat dissipater, the jacket, and the electrode holder are specially selected according to their thermal conductivity. For this, the invention uses the fact that heat from a bad thermal conductor will transfer to a good thermal conductor. Therefore, because of the higher thermal conductivity of the heat dissipater, the heat generated at the electrode holder will transfer directly to the heat dissipater and be carried away by the cooling medium. At the same time, the jacket, which has a lower thermal conductivity than the heat dissipater, acts like an insulator to prevent an overheating of the torch body. This enables the temperature of the handle to remain notably below the norm during testing, which significantly improves the handling of the arcwelding torch, especially during prolonged welding operations. Simultaneously this optimized heat dissipation leads to a reduction in the size of the arcwelding torch at the same current load for substantially easier handling. On the other hand, the improved cooling with the same current load leads to an extended tool life, compared to familiar arcwelding torches.

For liquid cooled arcwelding or cutting torches, the realization of the invention provides for the material of the electrode holder to have better thermal conductivity than that of the jacket. This assures that the heat to be eliminated is concentrated on the heat dissipater without notable heat transfer to the outside or especially the handle.

As far as the selection of the material for liquid cooled arcwelding or cutting torches is concerned, the invention determines that the heat dissipater can be of copper, the electrode holder of a non-ferrous metal like e.g. brass, and the jacket of special steel.

According to the invention, it is recommended for gas cooled arcwelding or cutting torches, especially those with high current loads, that the shielding gas flows through and/or around the torch body. Also the equation for the heat conductivity of the materials of the heat dissipater, jacket, and electrode holder should be $_xK>_xE$, $_xA$, or preferably $_xK>_xA>_xE$. This causes a direct heat transfer of the generated heat from the electrode holder to the heat dissipater, to be subsequently carried off by the shielding gas flowing around the heat dissipater. Because of the lower thermal conductivity of the electrode holder, a heat transfer into the direction of the rear parts of the torch is avoided. The lower thermal conductivity of the jacket compared to that of the heat dissipater assures that there is no excessive transfer of residual heat to the outside and eliminates a melting of the insulating plastic coveting in the area of the torch tip and also an overheating of the handle.

The invention intends for a gas cooled arcwelding or cutting torch with high current load to consist of the following materials, copper for the heat dissipater, a non-ferrous metal for the jacket e.g. brass, and special steel for the electrode holder. This material selection guarantees the direct heat transfer to the heat dissipater and avoids a reflection of the heat over the electrode holder to the torch tip. The use of brass for the jacket also insures that there is no excessive reflection of the residual heat to the torch tip.

For gas cooled arcwelding or cutting torches of low current loads, e.g. up to 200 Amps., the heat dissipater and the jacket can be constructed in one unit, according to the invention, while the following is valid for the thermal conductivity of the materials $_xK/A>_xE$. Compared to high current load arcwelding torches, such low Amp. torches do not have the same high reflection of the arc, so that the manufacturing and installation can be simplified by constructing heat dissipater and jacket in one unit and thus the heat transfer is accomplished with the whole torch body. This means that the heat dissipater with the jacket can consist of non-ferrous metal, e.g. brass, and the electrode holder of special steel to achieve an efficient heat transfer from the electrode holder to the heat dissipater. If necessary, the one-piece torch body and heat dissipater can contain ridges, projections etc. radiating to the outside and/or axes for attaining improved heat dissipation through increasing the surface area of whole torch body. In any case it guarantees, that the insulating plastic covering of the torch tip is protected against overheating and separation, and it also keeps the temperature of the handle within the set standard.

Another recommendation of the invention is to place the heat dissipater next to the circulation channels of the coolant, which are aligned behind each other along the length of the torch. This achieves an especially efficient heat transfer from the heat dissipater to the coolant, by forcing the coolant into a longer flow path.

The invention also intends to locate the circulation channels between the heat dissipater and the jacket, which is an advantageous method of construction. For example, the circulation channels can be formed by the ridges of the heat dissipater, that are radiating to the outside towards the jacket. This will achieve an additional increase in the thermal conductive surface of the heat dissipater.

In a special design of the invention, offset apertures around the perimeter of the circulation channels connect them to each other, directing the flow of the coolant into the circulation channels and achieving an efficient heat transfer to the heat dissipater.

The invention has as alternative solution, especially for MIG-MAG torches, where the circulation channels extend in a spiral along the torch axis, which allows for a simple assembly.

For liquid cooled arcwelding or cutting torches, the invention devises a method, possibly a special leader channel, for the coolant to be fed into the circulation channels at the contact area between the electrode holder and electrode to be channeled back to the coolant return pipe towards the rear of the torch. This allows a very effective and controlled supply and guidance of the coolant, compared to most familiar torches, where the coolant is already heated up by the time it reaches the hottest area and cannot achieve the necessary thermal transfer.

Another cooling method for liquid cooled arcwelding or cutting torches, according to the invention, is to supply additional coolant to a reservoir and have it flow from there to the front of the torch into a cooling chamber, which is connected to the return flow pipe. This causes pressure in the reservoir, which speeds up the flow of the coolant into the cooling chamber and from there into the direction of the gas jet. This velocity increase of the coolant achieves a particularly effective thermal transfer.

Another purpose of the invention further is to include an opening for the shielding gas, which is the coolant in arcwelding torches with gas cooling. This ring-shaped opening is concentrically aligned to the electrode holder and represents a flow connection with the first circulation channel of the gas jet.

Finally there is no need to solder the functioning parts of the torch, because of the low thermal load. Thus the invention suggests that the jacket, the heat dissipater and/or also the electrode holder be constructed as molded pieces. These molded pieces excel through greatly reduced production costs and optimal fit.

Other aims, advantages, features, and possible uses of the present invention will arise from the following description of the design examples through diagrams. Thus all described and/or graphically displayed features represent, by themselves or in any random combination, the object of the present invention, independent of their claims summary or their relative connection.

BRIEF DESCRIPTION OF THE DRAWINGS

The following is shown in:

FIG. 4 a longitudinal diagram of a further type of liquid cooled WIG torch, according to specifications of the invention.

DESCRIPTION OF THE PREFERRED EMBODIMENTS

Figure 1:
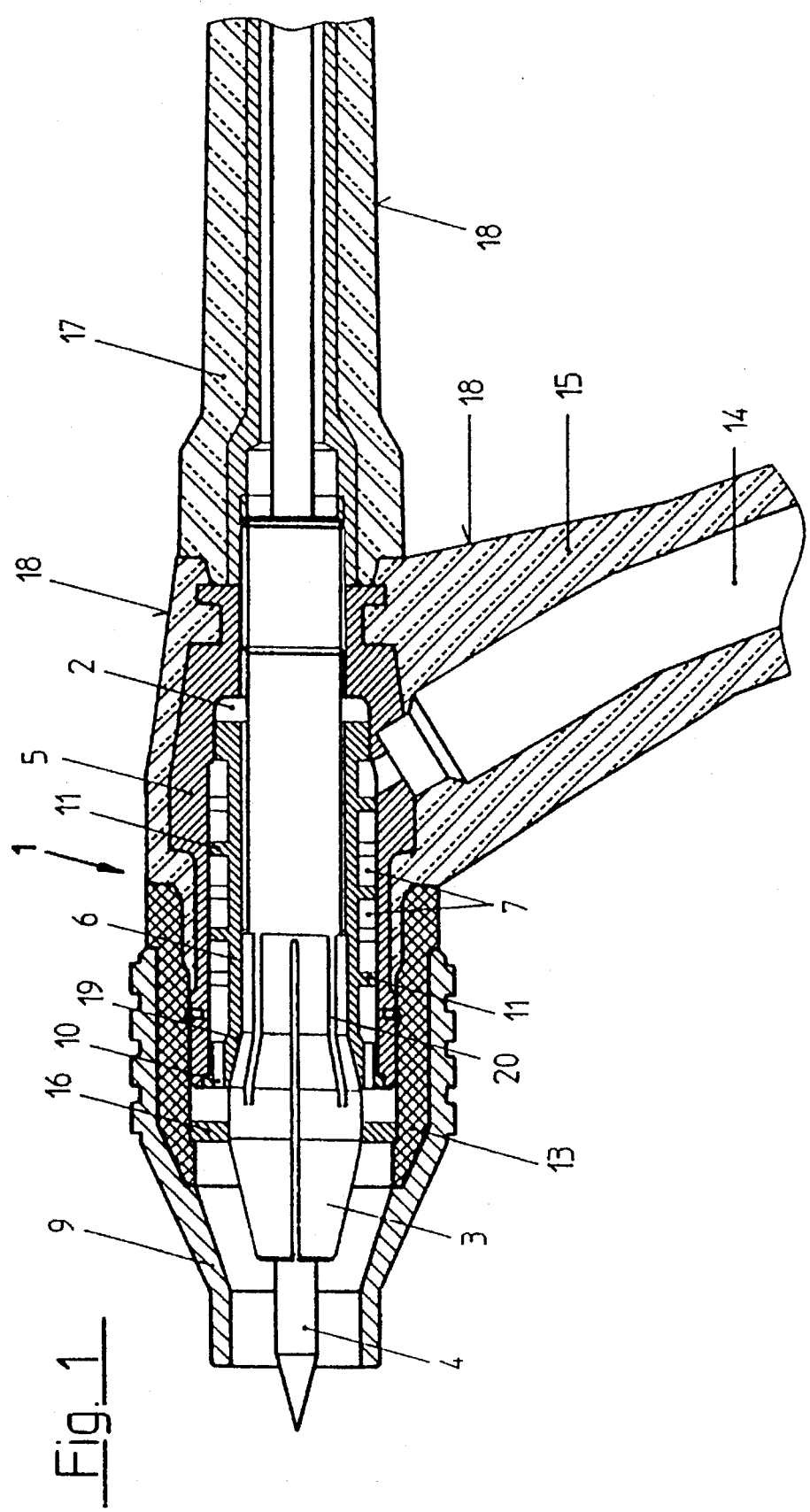
FIG. 1 a longitudinal diagram of a possible type of gas cooled WIG torch, according to specifications of the invention.

According to FIG. 1, the gas cooled WIG torch has a torch body 1, with a jacket 5, which forms a housing 2 for holding a heat dissipater 6 and an electrode holder 3. The electrode holder 3, which is shaped like an adapter sleeve, grips the electrode 4. Attached to the frontal end of the jacket 5 is an insulator 13, which forms the seat of a metallic gas jet 9. According to FIG. 1, a gas lens 16 is inserted to allow for a better diffusion of the shielding gas, proceeding from the feeding pipe 14 in the torch neck 15. On the end of the torch body 1 opposite the gas jet 9, there is a torch cap 17, which covers the current conducting electrode 4. A plastic covering 18 encloses the torch body 1, as well as the torch neck 15 and the torch cap 17.

As can be seen in FIG. 1, the heat dissipater 6 is placed between the jacket 5 and the electrode holder 3 and simultaneously forms the cone shaped seat 19 of the adapter sleeve, in this case the electrode holder 3, on which the torch cap 17 can be screwed. The heat dissipater 6 contains ridges 11, radiating to the outside toward the adjoining jacket 5 to form with it the circulation channels 7, which are arranged behind one another along the length of the torch. The circulation channels 7, furthermore, have flow connections through apertures 24, offset around their perimeter. The circulation channel 7 closest to the gas jet 9 exhibits a ring-shaped exit opening 10, extending towards the gas lens 16. This directs the shielding gas, coming from the feeding pipe 14 in the torch neck 15, to circulate through the circulation channels 7, in order to enter the gas lens 16 through the exit opening 10, and finally from there exit the torch through the gas lens 9.

According to FIG. 1, an essential feature of the torch is, that the material of the heat dissipater 6 possesses a much higher thermal conductivity $_xK$ than that of the electrode holder 3, and that the material of the jacket 5 possesses a much higher thermal conductivity $_xA$ than that of the electrode holder 3. Summed up the relationship is as follows: $_xK>_xA>_xE$. By selecting materials of different thermal conductivity for the active parts of the torch, an immediate heat transfer is effected from the electrode holder 3 to the heat dissipater 6, due to the higher thermal conductivity $_xK$ of the heat dissipater 6. This heat is generated through the electric contact between the electrode holder 3 and the electrode 4. At the same time, the jacket 5 of the torch body 1 forms a thermal barrier, since its thermal conductivity $_xA$ is lower than that of the heat dissipater 6, so that the generated heat is immediately diverted to the shielding gas, which serves as coolant, and is then carried to the outside. The lengthened flow path of the circulation channels 7 and, therefore, also the increased contact surface for the shielding gas, has an advantageous effect on the diversion of the heat from the heat dissipater 6. It avoids a reversal of the residual heat and thus a melting of the plastic covering 18 to the torch body 1 and the torch neck 15, as well as the overheating of the handle itself.

Figure 2:
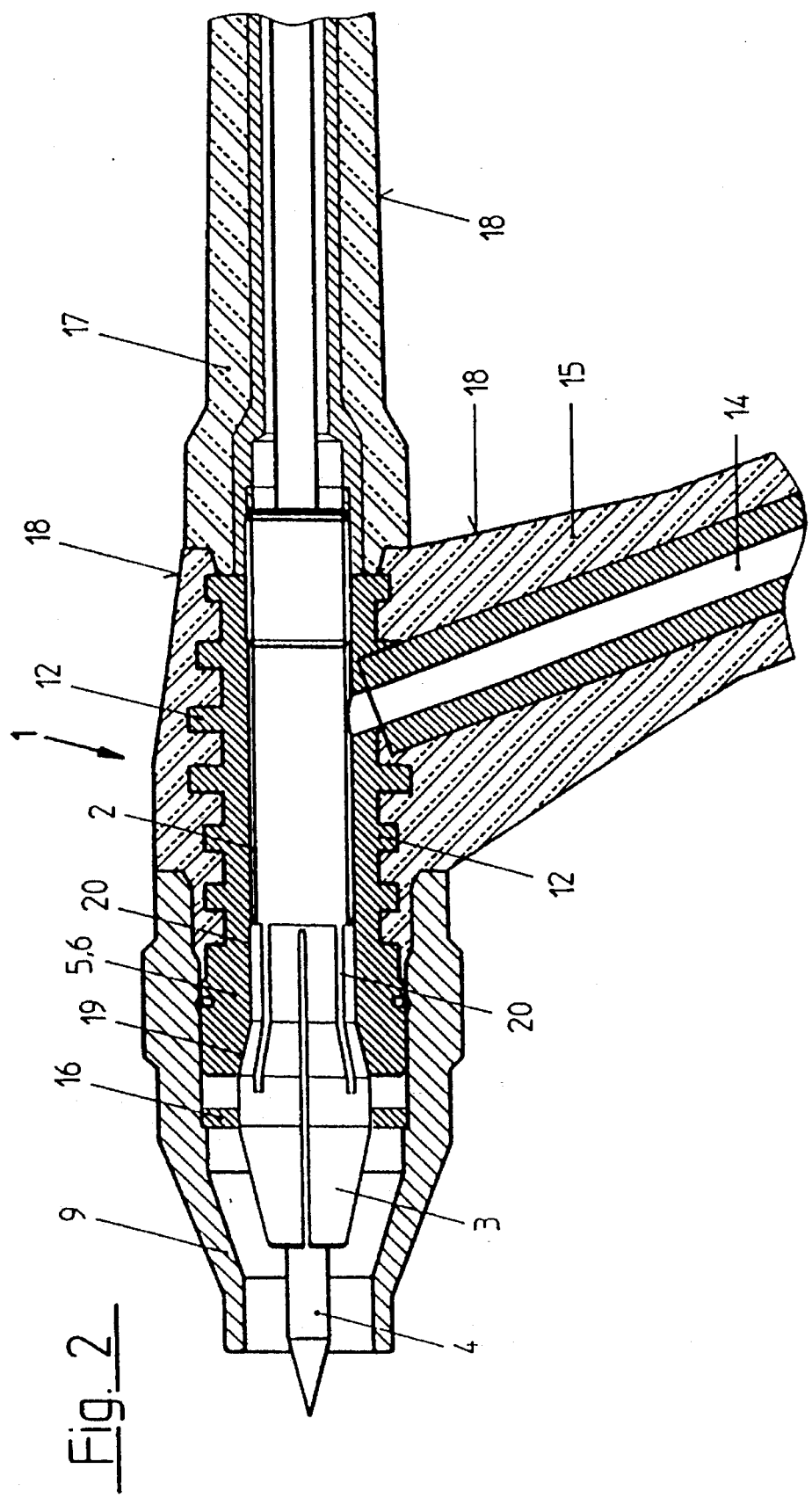
FIG. 2 a longitudinal diagram of a different type of gas cooled WIG torch, according to specifications of the invention, FIG. 3 a longitudinal diagram of again another type of liquid cooled WIG torch, according to specifications of the invention.

FIG. 2 also represents a gas cooled WIG torch, where the active pans, corresponding to the torch of FIG. 1, are identified with the same reference numbers, so that a description in detail can be omitted. Contrary to that in FIG. 1, the torch in FIG. 2 is designed for a lower current load, that is up to 200 Ampere. Due to the relatively low reflective heat of the arc, compared to a torch of high amperage, the jacket 5 and the heat dissipater 6 can be executed in a single unit, like e.g. brass, while the electrode holder 3 in this selected example consists of special steel. Due to the higher thermal conductivity $_\chi$K/A of the heat dissipater 6 and the jacket 5 compared to the electrode holder 3, the heat transfer occurs over the combined unit and from there to the shielding gas, which flows through lead slits 20 of the electrode holder 3 to the outside. Additionally, the total body, formed of heat dissipater 6 and jacket 5, contains ridges 12 radiating to the outside, which represent a surface increase and promote the diversion and dissipation of the residual heat. These procedures suffice for such torches of relatively low current load to protect the insulating plastic covering 18 of the torch head against overheating and separation and to keep the temperature at the torch neck 15 and at the handle from exceeding the set standard.

FIG. 3 displays a liquid cooled torch, which, similar to the torch in FIG. 1, has a heat dissipater 6 with gradating circulation channels 7. The coolant comes through a flow pipe 21 and is then directed with a lead channel 25 to the circulation channel 7b nearest to the gas jet 9 in the contact area of the electrode holder 3 and the electrode 4. Then the coolant flows through the gradating circulation channels 7, which are connected with one another by perforations 24, towards the back part of the torch and is finally channeled away by the return flow pipe 8. In the selected design example, the jacket 5 consists of special steel, the heat dissipater 6 of copper, and the electrode holder 3 of brass. The heat generated at the tip of the electrode holder 3 is directly transferred to the heat dissipater 6 because of the choice of the different materials, and thus also the different thermal conductivity, of the active parts of the torch body 1. From the heat dissipater 6, the heat is transferred to the liquid coolant which flows through the circulation channels 7 into the direction of the rear of the torch. At the same time, the jacket 5 of the torch body 1 forms a thermal barrier, because of its low thermal conductivity $_\chi$A, so that the excess heat stays concentrated on the heat dissipater 6. From there the heat is transferred to the liquid coolant, which flows across the contact surface, increased by ridges 11, of the heat dissipater 6 and is directed into the circulation channels 7 to be diverted away, without causing the torch body 1 or the torch neck 15 with the handle to overheat.

In the water cooled WIG torch in FIG. 4, the active parts of the torch are also identified with the same reference numbers as in FIGS. 1 and 3, so that a detailed description can again be omitted. A significantly different feature of the liquid cooled WIG torch in FIG. 4 is the design of the heat dissipater 6 with two cooling chambers. The liquid is channeled with a flow pipe 21 into a reservoir 22. Due to the flow pressure in the reservoir 22, the flow of the coolant is accelerated towards the direction of the gas jet 9, from where it is channeled into the return flow pipe 8. The acceleration of the coolant into the cooling chamber 23 results in a most effective heat transfer. The heat dissipater 6 consists of brass in the design of FIG. 4, the jacket 5 is of special steel and the electrode holder 3 of brass, but the brass alloy of the electrode holder 3 has a lower thermal conductivity $_\chi$E than the material of the heat dissipater 6.

The selection of materials with different thermal conductivity for the individual components of the torch I is not limited to WIG torches, but can also be used advantageously with Plasma arcwelding torches as well as with MIG/MAG arcwelding or cutting torches.

The improved cooling of the torch I enables the individual active parts of the torch 1, like the heat dissipater 6 and the jacket 5, to be manufactured as molded parts. But those will not have to be soldered together during assembly.

List of references:

1 - torch body
2 - housing
3 - electrode holder
4 - electrode
5 - jacket
6 - heat dissipater
7 - circulation channel
7a - circulation channel
7b - circulation channel
8 - return flow pipe
9 - gas jet
10 - exit opening
11 - ridge
12 - ridge
13 - insulator
14 - feeder pipe
15 - torch neck
16 - gas lens
17 - torch cap
18 - plastic covering
19 - seat
20 - lead slit
21 - flow pipe
22 - reservoir
23 - cooling chamber
24 - perforation
25 - guiding channel
$_\chi$K - thermal conductivity of the heat dissipater
$_\chi$E - thermal conductivity of the electrode holder
$_\chi$A - thermal conductivity of the jacket
$_\chi$K/A - thermal conductivity of the jacket with the heat dissipater

I claim:

1. An arc welding or cutting torch, comprising:

a torch body;

a jacket substantially encased within said torch body;

an electrode holder substantially encased within said jacket; and a heat dissipater interposed between said electrode holder and said jacket, said heat dissipater being made of a material with a relatively greater thermal conductivity than material forming that of the electrode holder.

2. The torch of claim 1, wherein said torch includes an inlet flow pipe in fluid communication with coolant circulation channels having walls at least partially defined by said heat dissipater, said inlet flow pipe and coolant circulation channels providing means for contacting said heat dissipater with a flowing liquid coolant to cool the torch, and wherein the thermal conductivity of the heat dissipater is greater than that of the electrode holder, and the thermal conductivity of the electrode holder is greater than that of the jacket.

3. The torch of claim 1, wherein the heat dissipater is made of copper, the electrode holder is made of a non-ferrous material, and the jacket is made of steel.

4. The torch of claim 1, wherein said torch includes a gas feeding pipe in fluid communication with circulation channels having walls at least partially defined by said heat dissipater, said gas feed pipe and circulation channels providing means for contacting said heat dissipater with a flowing gas to cool the torch, and wherein the thermal conductivity of the heat dissipater is greater than that of the electrode holder.

5. The torch of claim 4, wherein the heat dissipater is made of copper, the jacket is made of a non-ferrous metal, and the electrode holder is made of steel.

6. The torch of claim 1, wherein said torch is gas cooled, wherein the heat dissipater and the jacket are built in one unit, and wherein a thermal conductivity of the heat dissipater and jacket combined is greater than a thermal conductivity of the electrode holder.

7. The torch of claim 1, wherein one of the heat dissipater or the torch body has cooling surfaces.

8. The torch of claim 1, wherein said heat dissipater adjoins coolant circulation channels, the coolant circulation channels being laterally disposed to one another along a length of the torch.

9. The torch of claim 8, wherein the circulation channels are formed by one of radial ridges protruding outside, or by steps between the heat dissipater and the jacket.

10. The torch of claim 9, wherein the circulation channels are connected with one another by perforations, which are arranged offset around a perimeter of said circulation channels.

11. The torch of claim 9, wherein the circulation channels extend in spirals along an axis of the torch.

12. The torch of claim 8, wherein said torch is liquid cooled, wherein the liquid coolant is piped into circulation channels in said torch, at a contact area between the electrode holder and the welding electrode, and wherein the circulation channels extend back to a rear of the torch towards a coolant return pipe.

13. The torch of claim 1, wherein said torch includes a coolant supply line in fluid communication with a reservoir which is disposed rearward of a front of the torch, a cooling chamber, and a coolant return line, and wherein coolant flows from the reservoir towards the front of the torch and into said cooling chamber connected to said return pipe.

14. The torch of claim 8, wherein said torch is gas cooled and wherein the heat dissipater contains a ring-shaped exit opening for the shielding gas, said opening being aligned concentrically to the electrode holder and connecting to a flow path of a front circulation channel relative to a gas jet.

15. The torch of claim 1, wherein the jacket is a molded part.

16. The torch of claim 1, wherein the heat dissipater is a molded part.

17. The torch of claim 1, wherein the electrode holder is a molded part.

18. An arc welding or cutting torch, comprising:

a torch body;

a jacket substantially encased within said torch body; and an electrode holder substantially encased within said jacket;

said jacket having a thermal conductivity which is greater than that of said electrode holder.

19. The torch of claim 18, wherein the heat dissipater with jacket is made of a non-ferrous metal and the electrode holder is made of steel.

20. An arc welding or cutting torch, comprising:

a torch body a jacket substantially encased within said torch body;

an electrode holder substantially encased within said jacket; and a heat dissipater interposed between said electrode holder and said jacket, said heat dissipater being made of a material having a thermal conductivity which is greater than that of said electrode holder; and circulation channels located between said heat dissipater and said jacket, said circulation channels being in fluid communication with a coolant inlet pipe.

* * * * *